US012164158B2

United States Patent
Hsu et al.

(10) Patent No.: US 12,164,158 B2
(45) Date of Patent: Dec. 10, 2024

(54) PACKAGE HAVING PRISM STRUCTURE AND MANUFACTURING METHOD THEREOF

(71) Applicant: Taiwan Semiconductor Manufacturing Company, Ltd., Hsinchu (TW)

(72) Inventors: Che-Hsiang Hsu, Hsinchu (TW); Chen-Hua Yu, Hsinchu (TW); Chung-Shi Liu, Hsinchu (TW); Hao-Yi Tsai, Hsinchu (TW); Cheng-Chieh Hsieh, Tainan (TW); Hung-Yi Kuo, Taipei (TW); Tsung-Yuan Yu, Taipei (TW); Hua-Kuei Lin, Hsinchu (TW); Chung-Ming Weng, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 367 days.

(21) Appl. No.: 17/462,009

(22) Filed: Aug. 31, 2021

(65) Prior Publication Data

US 2023/0066363 A1  Mar. 2, 2023

(51) Int. Cl.
*G02B 6/42* (2006.01)
(52) U.S. Cl.
CPC ................... *G02B 6/4214* (2013.01)
(58) Field of Classification Search
CPC ........................................... G02B 6/42
USPC ........................................... 385/33
See application file for complete search history.

(56) References Cited

U.S. PATENT DOCUMENTS

| | | | |
|---|---|---|---|
| 5,783,836 A * | 7/1998 | Liu | G01N 21/77 250/559.4 |
| 5,835,458 A * | 11/1998 | Bischel | G11B 7/1353 369/44.29 |
| 7,691,731 B2 * | 4/2010 | Bet | H01L 21/02601 257/E21.174 |
| 8,993,380 B2 | 3/2015 | Hou et al. | |
| 9,281,254 B2 | 3/2016 | Yu et al. | |
| 9,299,649 B2 | 3/2016 | Chiu et al. | |
| 9,372,206 B2 | 6/2016 | Wu et al. | |
| 9,425,126 B2 | 8/2016 | Kuo et al. | |
| 9,443,783 B2 | 9/2016 | Lin et al. | |
| 9,461,018 B1 | 10/2016 | Tsai et al. | |
| 9,496,189 B2 | 11/2016 | Yu et al. | |
| 9,666,502 B2 | 5/2017 | Chen et al. | |

(Continued)

FOREIGN PATENT DOCUMENTS

| | | | | |
|---|---|---|---|---|
| WO | WO-2009042671 A1 * | 4/2009 | ........ | B01L 3/502707 |
| WO | WO-2018213038 A1 * | 11/2018 | ......... | G02B 6/12011 |

*Primary Examiner* — Kaveh C Kianni
(74) *Attorney, Agent, or Firm* — JCIPRNET

(57) ABSTRACT

A package includes an electronic die, a photonic die underlying and electronically communicating with the electronic die, a lens disposed on the electronic die, and a prism structure disposed on the lens and optically coupled to the photonic die. The prism structure includes first and second polymer layers, the first polymer layer includes a first curved surface concaving toward the photonic die, the second polymer layer embedded in the first polymer layer includes a second curved surface substantially conforming to the first curved surface, and an outer sidewall of the second polymer layer substantially aligned with an outer sidewall of the first polymer layer.

13 Claims, 11 Drawing Sheets

(56) References Cited

U.S. PATENT DOCUMENTS

| | | |
|---|---|---|
| 9,735,131 B2 | 8/2017 | Su et al. |
| 2002/0028045 A1* | 3/2002 | Yoshimura .......... H01L 23/5389 |
| | | 385/39 |
| 2003/0132528 A1* | 7/2003 | Liang ...................... H01L 24/81 |
| | | 257/E21.503 |
| 2006/0008199 A1* | 1/2006 | Glebov .................... G02B 6/43 |
| | | 385/36 |
| 2011/0207328 A1* | 8/2011 | Speakman ............ H10K 71/221 |
| | | 438/694 |
| 2013/0334511 A1* | 12/2013 | Savas ................ H01L 31/02167 |
| | | 257/432 |
| 2017/0031115 A1* | 2/2017 | Schaevitz ............. G02B 6/4228 |
| 2018/0337111 A1* | 11/2018 | Jou ...................... G02B 6/4214 |
| 2022/0059740 A1* | 2/2022 | Hahn ...................... H01L 33/44 |

\* cited by examiner

PACKAGE HAVING PRISM STRUCTURE AND MANUFACTURING METHOD THEREOF

BACKGROUND

Currently, semiconductor packages including both photonic dies (known as P-dies) and electronic dies (known as E-dies) are becoming increasingly popular for their compactness. In addition, due to the widely use of optical fiber-related applications for signal transmission, optical signaling and processing have been used in more applications. For example, a prism structure receives light beam from an optical fiber and refracts it to a coupling region in the P-die. Although existing methods of fabricating the semiconductor packages have been generally adequate for their intended purposes, they have not been entirely satisfactory in all respects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
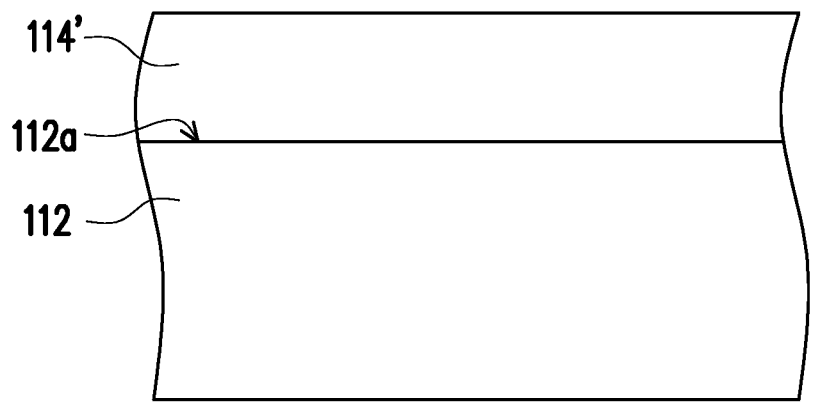
FIGS. 1A-1E are schematic cross-sectional views of intermediate stages in the formation of a prism structure, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

Embodiments of the present disclosure are discussed in the context of semiconductor manufacturing, and in particular, in the context of forming a package having a prism structure. Some variations of embodiments are discussed and the intermediate stages of forming the package are illustrated in accordance with some embodiments. It should be appreciated that the illustration throughout the drawings are schematic and not in scale.

Figure 1B:
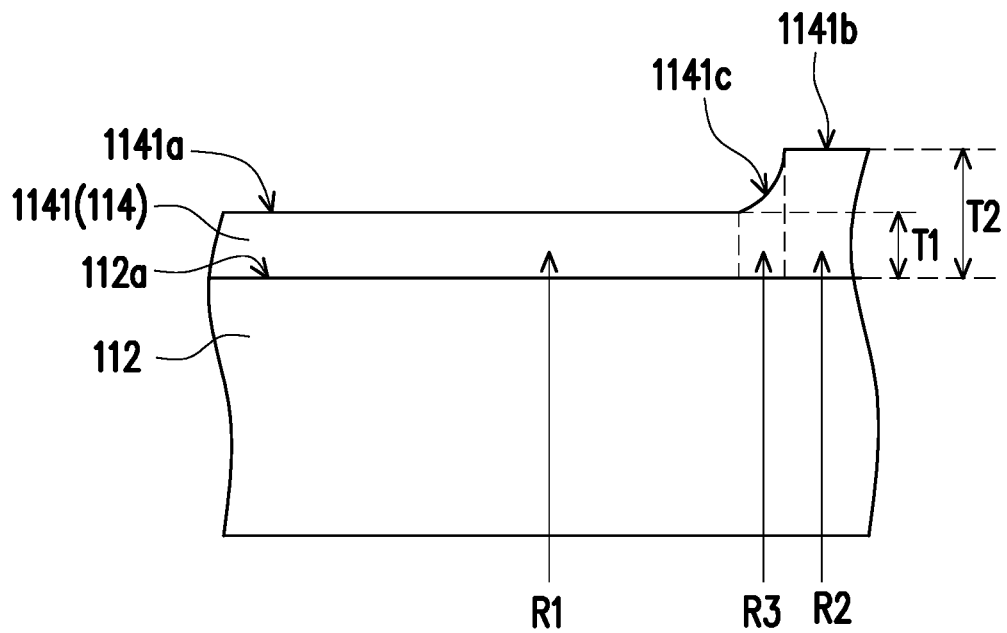

FIGS. 1A-1E are schematic cross-sectional views of intermediate stages in the formation of a prism structure according to some embodiments. Referring to FIGS. 1A-1B, a first portion 1141 of a first polymer layer 114 is formed on a carrier substrate 112 by a lithographic process including coating, mask alignment, exposure, and development. For example, a first polymer material 114' is formed on a major surface 112a of the carrier substrate 112, and then a portion of the first polymer material 114' is removed to form the first portion 1141 of the first polymer layer 114.

The carrier substrate 112 may be or may include a bulk silicon substrate, a silicon germanium substrate, or a substrate formed of other semiconductor materials. Alternatively, the carrier substrate 112 is made of any suitable support material such as ceramic, glass, quartz, plastic, metal, etc. In some embodiments, a grinding process is performed to thin down the carrier substrate 112 to a desired thickness prior to the formation of the first polymer material 114'. Alternatively, the grinding process of the carrier substrate 112 may be performed during any step of the formation of the prism structure. In some embodiments, the first polymer material 114' is formed by spin-coating, physical vapor deposition (PVD), chemical vapor deposition (CVD), atomic layer deposition (ALD), or any suitable deposition process. The first polymer material 114' may be or may include a light sensitive material (e.g., a photoresist), epoxy-based polymer material. In some embodiments, the refractive index of the first polymer material 114' is in a range of about 1.5 to about 1.7. Other dielectric material may be suitable, in accordance with other embodiments.

In some embodiments, a lithographic mask (not shown) is positioned between radiation source (e.g., light beam) and the first polymer material 114' for exposing the first polymer material 114'. The lithographic mask may be used to transmit a portion of the incident intensity of radiation source, and sections of the first polymer material 114' are exposed to a gradient depth. For example, the lithographic mask is a gray-scale mask that is provided by creating layers of varying light passing characteristics on the surface of the mask. By varying the thickness of the layers on the surface of the gray-scale mask, the light density that is allowed to pass through the gray-scale mask may be made to vary. Alternatively, any suitable lithographic mask (e.g., a binary mask or a phase-shift mask) may be employed as long as the mask provides grade light passing capabilities from transparent to opaque and any intermediate degree of light blocking for parts of a pattern on the surface of the lithographic mask.

After exposure, the first polymer material 114' may be placed in a developer solution (not shown) for the developing process. In some embodiments where the first polymer material 114' is the positive-tone photoresist, the portions where more radiation energy struck the first polymer material 114' are dissolved by the developer solution more quickly than the portions where little energy made it through the lithographic mask. The exposure may render the exposed portions of the first polymer material 114' more soluble in the developer solution, while the unexposed portions of the first polymer material 114' remain unchanged.

As shown in FIG. 1B, the first portion 1141 of the first polymer layer 114 includes a first region R1, a second region R2, and a third region R3 connected to the first region R1 and the second region R2. In some embodiments, a major surface 1141a of the first portion 1141 in the first region R1 is substantially flat (e.g., planar), a major surface 1141b of the first portion 1141 in the second region R2 is also substantially flat (e.g., planar). For example, there is no abrupt slope change on the major surfaces (1141a and 1141b) in the first region R1 and the second region R2. In some embodiments, a major surface 1141c of the first portion 1141 in the third region R3 is non-planar (e.g., curved). For example, the major surface 1141a in the first region R1 is connected to the major surface 1141b in the second region R2 by way of the major surface 1141c having the curved profile in the third region R3. In some embodiments, the thickness T1 of the first portion 1141 in the first region R1 is less than the thickness T2 of the first portion 1141 in the second region R2. The major surface 1141c of the first portion 1141 in the third region R3 may have a slope that changes as a function of thickness (or height). For example, the thickness of the first portion 1141 in the third region R3 gradually increases along a direction from the first region R1 to the second region R2. It should be appreciated that the curvature and the profile of the curved major surface 1141c may vary depending on the characteristics (e.g., mode field diameter, refractive indices, etc.) of optical system as will be described later in other embodiments.

Figure 1C:
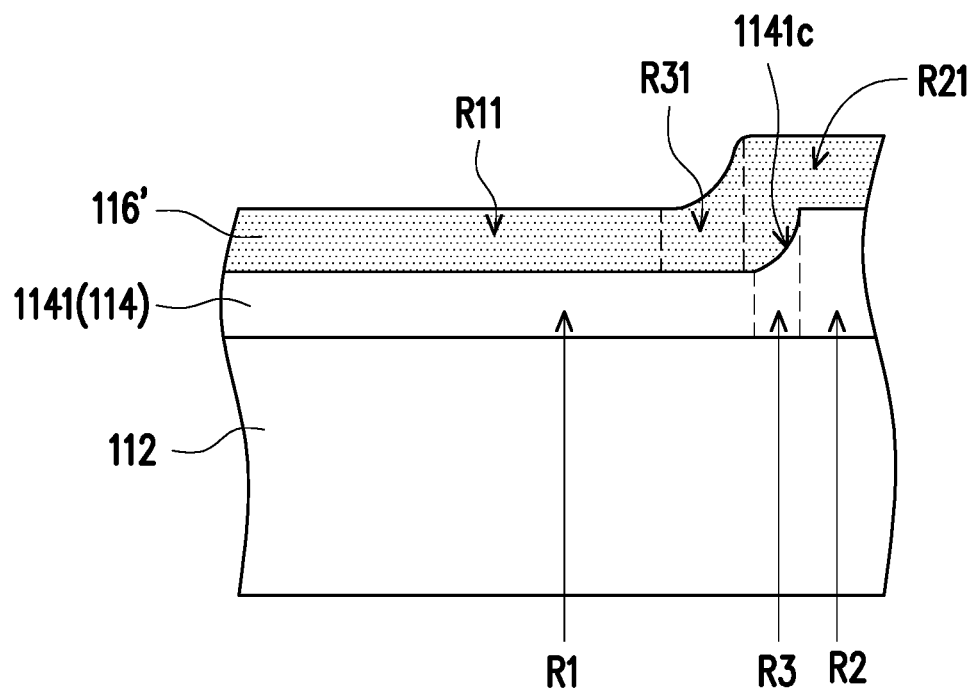

Referring to FIG. 1C, a second polymer material 116' is formed on the first portion 1141 of the first polymer layer 114. The second polymer material 116' may be formed by performing a lithography process (such as exposure and development) on the first portion 1141 of the first polymer layer 114. In some embodiments, the second polymer material 116' has the same (or similar) profile as the profile of the first portion 1141 of the first polymer layer 114. The second polymer material 116' may be made of a light sensitive material (e.g., a photoresist), an epoxy-based polymer material, or the like. In some embodiments, the refractive index of the second polymer material 116' is in a range of about 1.5 to about 1.7. In some embodiments, the first portion 1141 of the first polymer layer 114 and the second polymer material 116' are of different materials. In some embodiments, the refractive index of the second polymer material 116' is higher than that of the first portion 1141 of the first polymer layer 114. Alternatively, the refractive index of the second polymer material 116' is less than that of the first portion 1141 of the first polymer layer 114.

In some embodiments, the second polymer material 116' includes a first region R11, a second region R21, and a third region R31 connected to the first region R11 and the second region R21, where the first region R11 overlies the first region R1 of the first portion 1141 of the first polymer layer 114, the second region R21 overlies the second region R2 of the first portion 1141 and extends to cover the second region R3 of the first portion 1141, and the third region R31 is between the first region R11 and the second region R21. The thickness of the second polymer material 116' may not be limited as long as the major surface 1141c of the first portion 1141 in the third region R3 is covered by the second polymer material 116'.

Figure 1D:
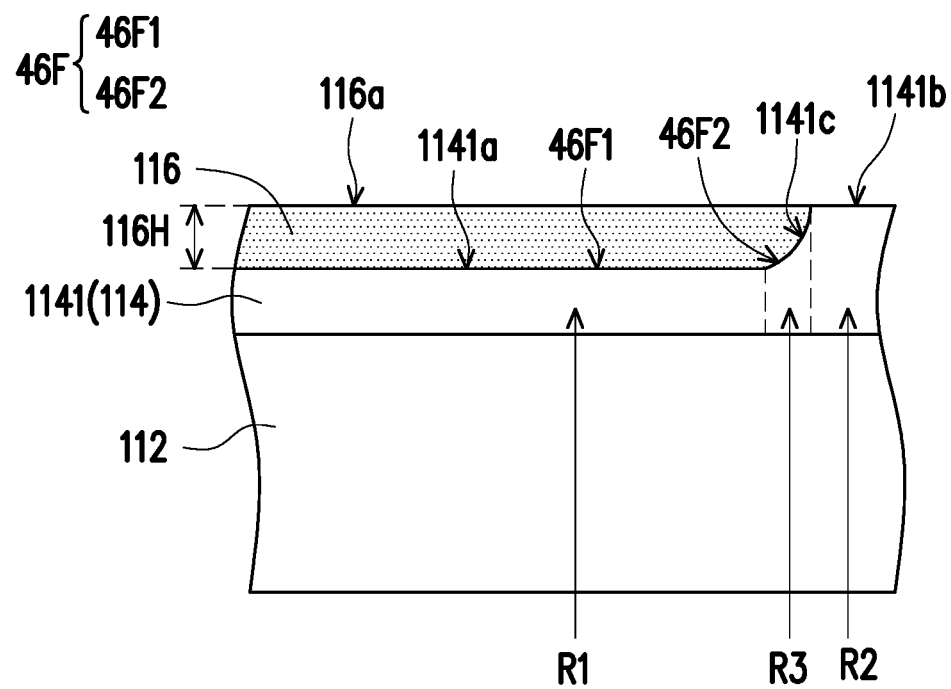

Referring to FIG. 1D and with reference to FIG. 1C, a portion of the second polymer material 116' is removed to form a second polymer layer 116. For example, the second polymer material 116' is thinned by a planarization process (e.g., chemical mechanical polishing (CMP), grinding, etching, a combination thereof, or the like). In some embodiments, a major surface 116a of the second polymer layer 116 is substantially leveled (e.g., coplanar) with the major surface 1141b of the first portion 1141 in the second region R2. The second polymer layer 116 may have a curved surface overlying and conforming to the major surface 1141c of the first portion 1141 in the third region R3. For example, the interface 46F between the first portion 1141 of the first polymer layer 114 and the second polymer layer 116 includes a first portion 46F1 and the second portion 46F2 connected to the first portion 46F1, where the first portion 46F1 corresponds to the major surface 1141a and the second portion 46F2 corresponds to the major surface 1141c.

Figure 3:
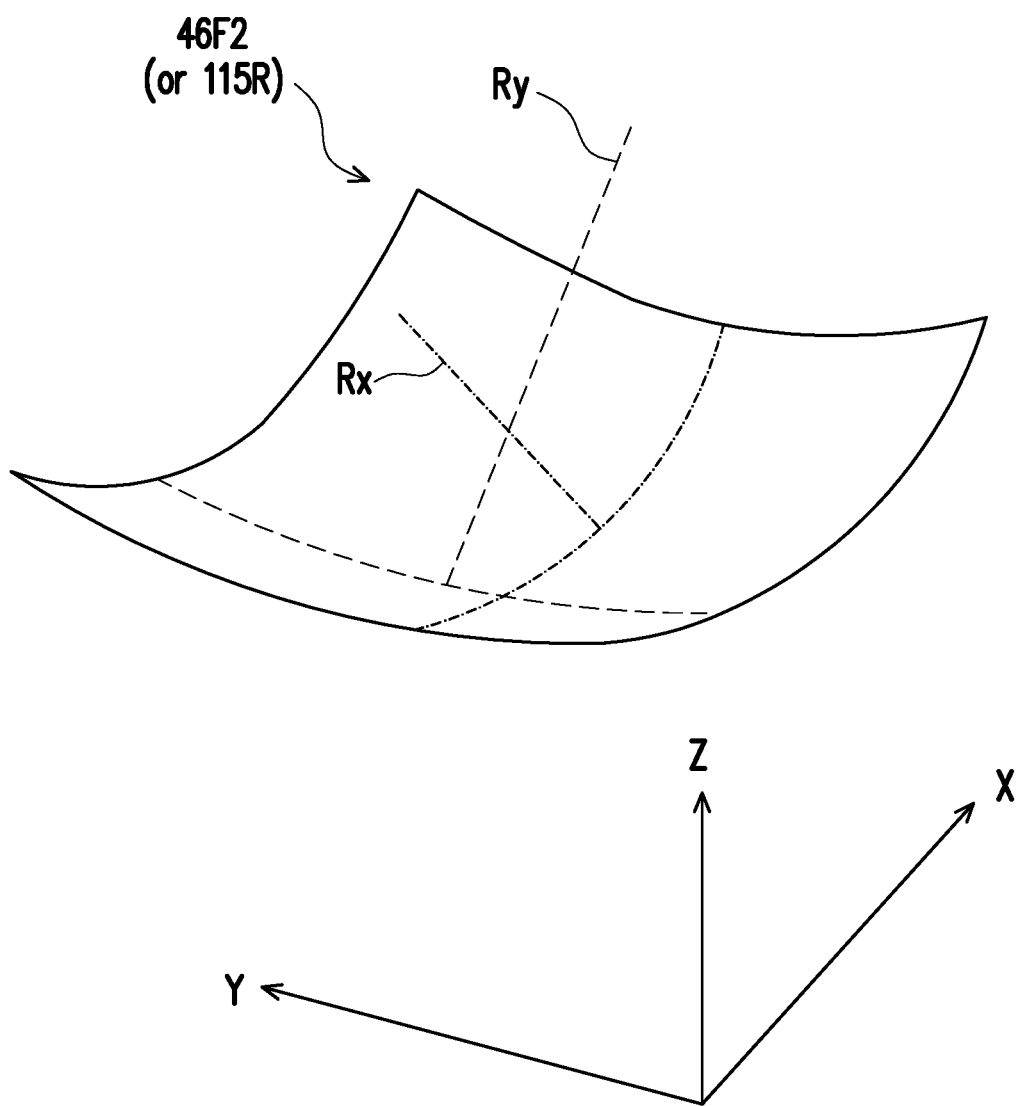
FIG. 3 is a schematic and perspective view of a reflective surface of a prism structure according to some embodiments.

In some embodiments, the second portion 46F2 having the curved profile acts as the reflective surface of the prism structure. The maximum thickness 116H of the second polymer 116 may be referred to as the height of the polymer waveguide. For example, the maximum thickness 116H of the second polymer 116 is about 80 μm. In some embodiments, the curved profile of the second portion 46F2 includes a first radius of curvature in the first cross-section and a second radius of curvature in the second cross-section that is different from the first radius of curvature in the first cross-section. For example, the second radius of curvature in the Y-cross-section is greater than the first radius of curvature in the X-cross-section as illustrated in FIG. 3. Depending on demands and design of optical system, the first and the second radii of curvature may be substantially equal, or the first radius of curvature may be greater than the second radius of curvature. It is appreciated that the radii of curvature in the cross sections may be controlled by modifying process parameters of gray-scale lithography.

Figure 1E:
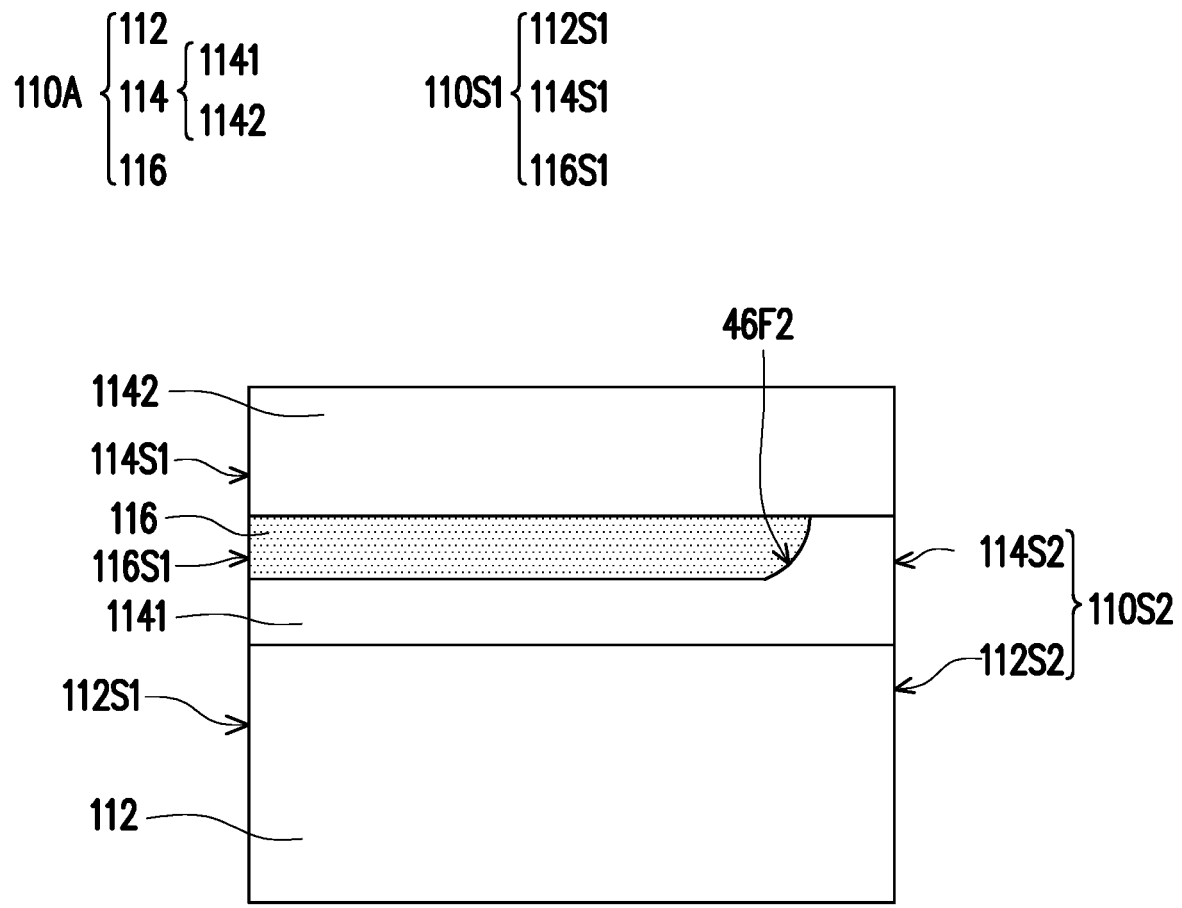

Referring to FIG. 1E and with reference to FIG. 1D, a second portion 1142 of the first polymer layer 114 is formed on the major surface 116a of the second polymer layer 116 and the major surface 1141b of the first portion 1141 of the first polymer layer 114 in the second region R2. The second portion 1142 may be formed by spin-coating, PVD, CVD, or any suitable deposition process. In some embodiments, the second portion 1142 and the first portion 1141 are of the same material so that no visible interface is formed therebetween. Alternatively, the second portion 1142 and the first portion 1141 are of different materials. A dashed line between the first portion 1141 and the second portion 1142 indicates that the visible interface may (or may not) exist. The thickness of the second portion 1142 may depend on process/product requirements and may not be limited in the disclosure.

In some embodiments, after the formation of the second portion 1142 of the first polymer layer 114, a singulation process (e.g., sawing, laser cutting, etching, a combination thereof, etc.) is performed along scribe lines (not shown) to form a plurality of prism structures 110A. The prism structure 110A may be picked and placed to be integrated into a package, in accordance with some embodiments. For example, the first polymer layer 114, the second polymer layer 116, and the carrier substrate 112 are cut through to form a first coterminous sidewall 110S1 of the prism structure 110A. The first coterminous sidewall 110S1 includes the singulated outer sidewall 114S1 of the first polymer layer 114, the singulated outer sidewall 116S1 of the second polymer layer 116, and the singulated outer sidewall 112S1 of the carrier substrate 112 that are substantially aligned with one another. The prism structure 110A may have a second coterminous sidewall 110S2 opposite to the first coterminous sidewall 110S1. The second coterminous sidewall 110S2 includes the singulated outer sidewall 114S2 of the first polymer layer 114 and the singulated outer sidewall 112S2 of the carrier substrate 112, where the second coterminous sidewall 110S2 is free of the second polymer layer 116.

FIGS. 2A-2G are schematic cross-sectional views of intermediate stages in the formation of a prism structure, in accordance with some embodiments. The formation of the prism structure described with reference to FIGS. 2A-2G may be similar to that of the prism structure 110A described with reference to FIGS. 1A-1E. Only the differences therebetween will be discussed, the like or the same part will not be repeated again, and the like numeral references indicate the like elements.

Figure 2A:
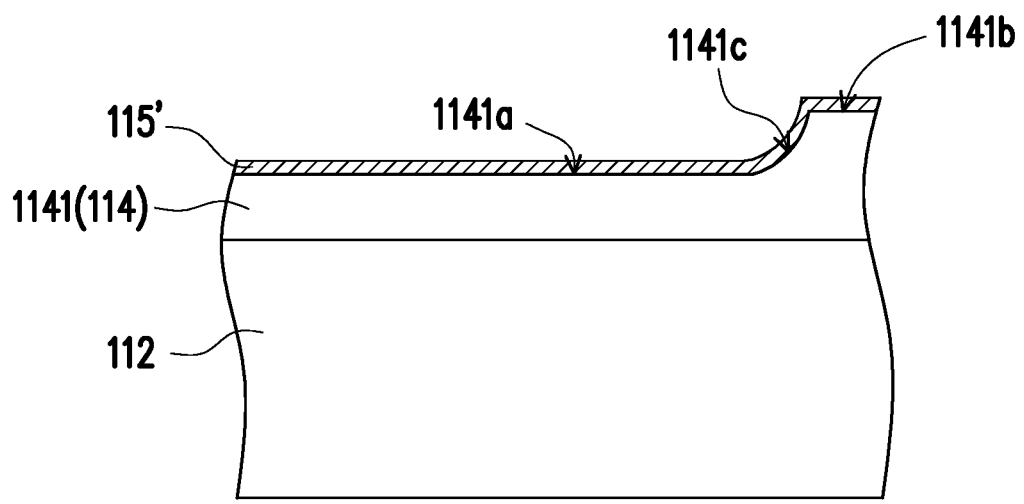
FIGS. 2A-2G are schematic cross-sectional views of intermediate stages in the formation of a prism structure, in accordance with some embodiments.

Referring to FIG. 2A, the first portion 1141 of the first polymer layer 114 is formed on the carrier substrate 112, and then a reflector material 115' is formed on the first portion 1141 of the first polymer layer 114. The formation of the first portion 1141 of the first polymer layer 114 may be similar to the process described in FIGS. 1A-1B, and thus the detailed descriptions are omitted for the sake of brevity. In some embodiments, the reflector material 115' conformally overlies the major surfaces (1141a, 1141b, and 1141c) of the first portion 1141 of the first polymer layer 114. The reflector material 115' may be a single layer of material or may include multi-layers of material(s). In some embodiments, the formation of the reflector material 115' may include depositing a barrier/adhesion metal material (e.g., Ti or Cr) and a highly reflective metal (e.g., Cu, Al, Ag, or Au). For example, a Ti/Cu sputtering process is performed to form the reflector material 115' on the first portion 1141 of the first polymer layer 114. Any other suitable material having a desired reflective property or process (e.g., PVD, plating, etc.) may also be used.

Figure 2B:
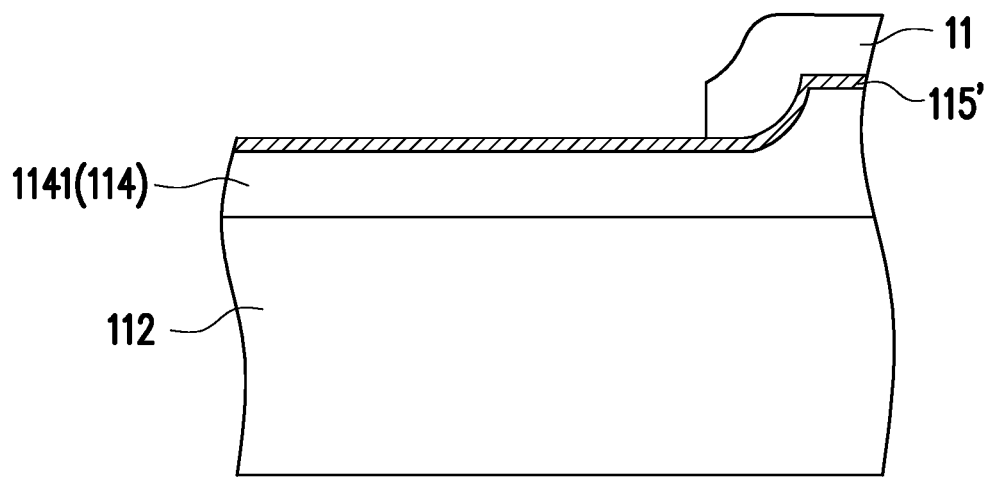
Figure 2C:
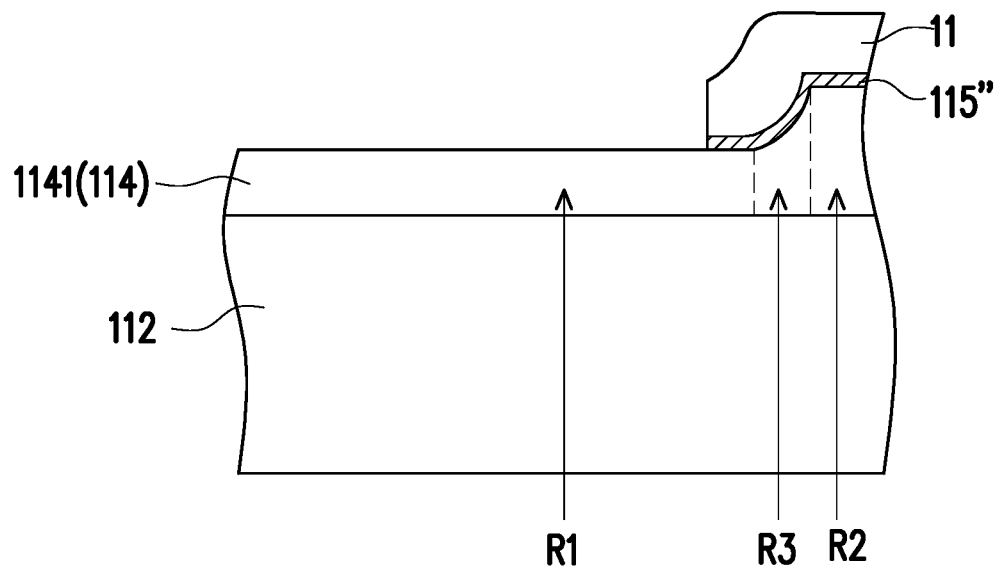
Figure 2D:
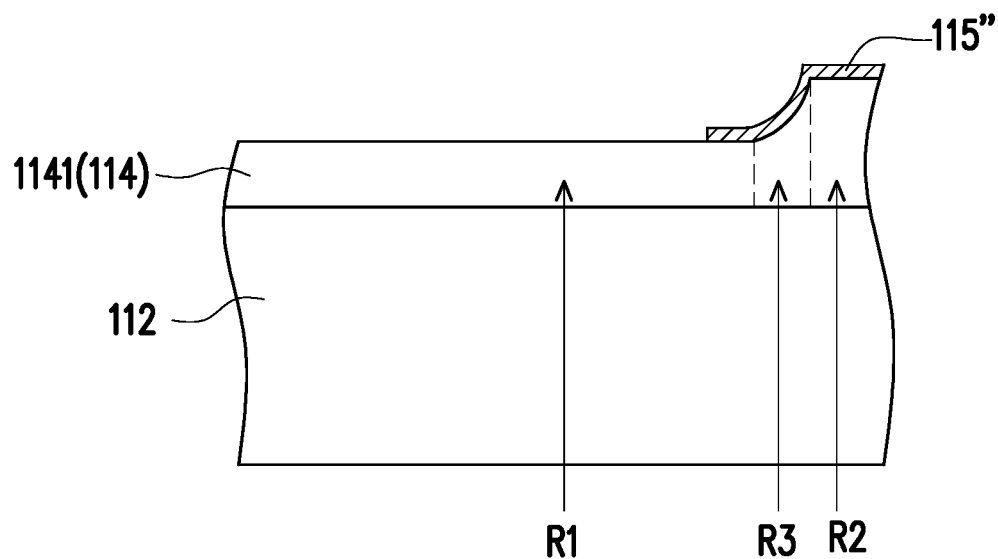

Referring to FIGS. 2B-2D, a sacrificial mask 11 is formed on the reflector material 115', and then a portion of the reflector material 115' that is unmasked by the sacrificial mask 11 may be removed to form a reflector material pattern 115". The sacrificial mask 11 may be considered sacrificial in the sense that it may be ultimately removed to accessibly expose the reflector material pattern 115", as shown in FIG. 2D. In some embodiments, the formation of the sacrificial mask 11 involves depositing a photoresist material, which is subsequently irradiated (exposed) and developed to pattern the photoresist material so as to form the sacrificial mask 11. Other suitable techniques may be employed to form the sacrificial mask 11. The sacrificial mask 11 may protect the underlying portion of the reflector material 115' from the subsequent processing step.

In some embodiments, the exposed portion of the reflector material 115' that is not covered by the sacrificial mask 11 may be removed to form the reflector material pattern 115" by an etching process (e.g., dry etch, or wet etch) or any suitable patterning process. After forming the reflector material pattern 115", the sacrificial mask 11 may be removed by using an ashing process followed by a wet clean process. Other suitable process may be used to remove the sacrificial mask 11 depending on the material property of the sacrificial mask 11. In some embodiments, the reflector material pattern 115" at least covers the first portion 1141 of the first polymer layer 114 in the third region R3. The reflector material pattern 115" may extend to cover the second region R2 that adjoin the third region R3. In some embodiments, the reflector material pattern 115" may also extend to partially cover the first region R1.

Figure 2E:
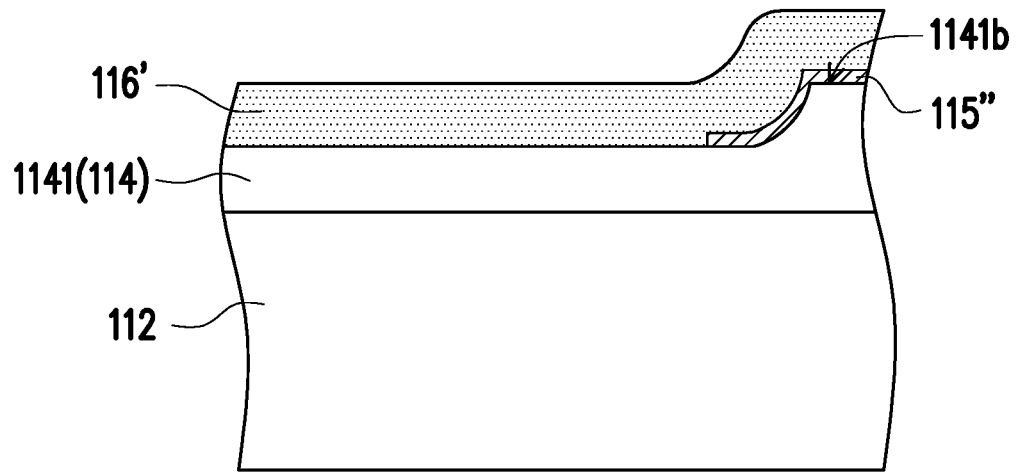
Figure 2F:
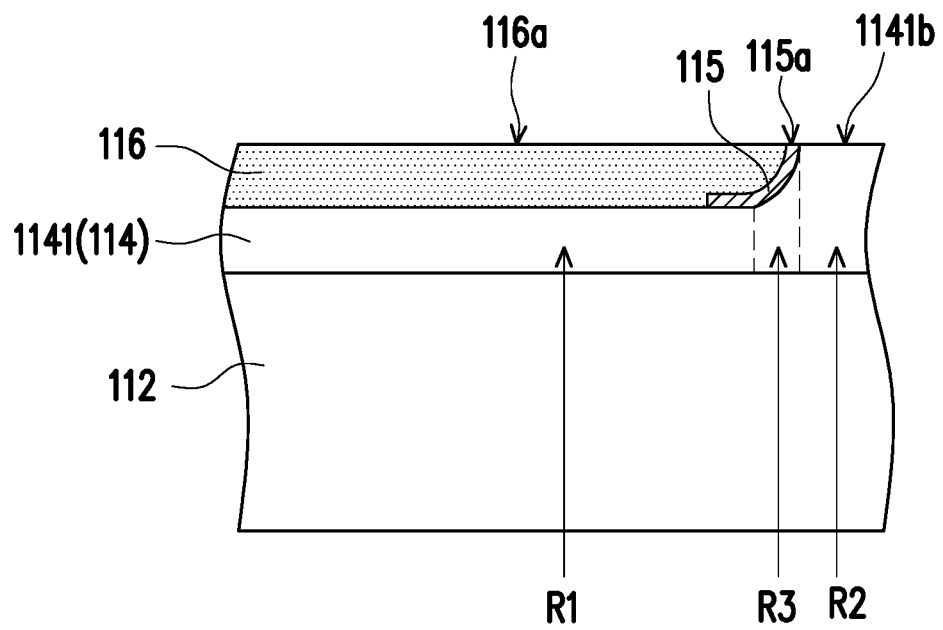

Referring to FIGS. 2E-2F, the second polymer material 116' is formed over the first portion 1141 of the first polymer layer 114 to cover the reflector material pattern 115". The formation of the second polymer material 116' is similar to the process described in FIG. 1C, and thus the detailed descriptions are omitted for the sake of brevity. After forming the second polymer material 116', a planarization process (e.g., CMP, grinding, etching, a combination thereof, and/or the like) may be performed on the second polymer material 116' to form the second polymer layer 116. In some embodiments, during the planarization process, a portion of the reflector material pattern 115" overlying the major surface 1141b of the first portion 1141 in the second region R2 may also be removed to form a reflector layer 115. For example, a facet 115a (e.g., an end surface of a curved profile) of the reflector layer 115 is substantially leveled (e.g., coplanar) with the major surface 116a of the second polymer layer 116 and the major surface 1141b of the first portion 1141 of the first polymer layer 114 in the second region R2.

Figure 2G:
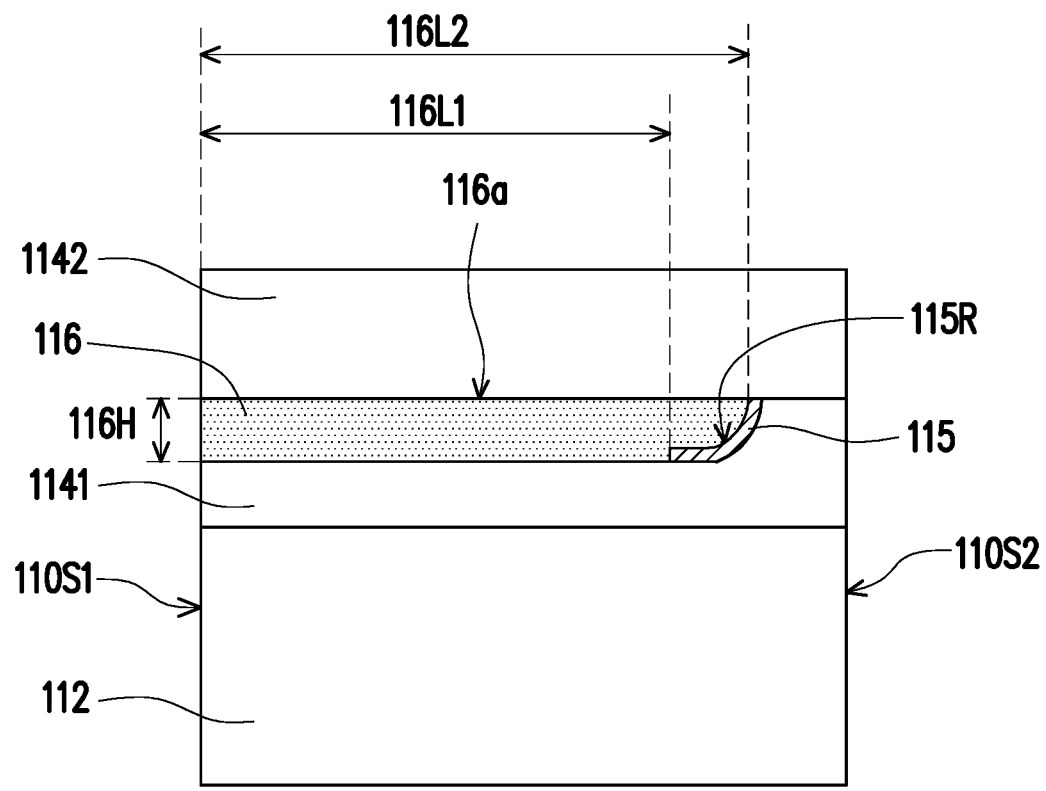

Referring to FIG. 2G and with reference to FIG. 2F, the second portion 1142 of the first polymer layer 114 may be formed on the facet 115a of the reflector layer 115, the major surface 116a of the second polymer layer 116, and the major surface 1141b of the first portion 1141 in the second region R2. The formation of the second portion 1142 of the first polymer layer 114 may be similar to the process described in FIG. 1E. The material of the first portion 1141 and the second portion 1142 may be the same, and thus no visible interface may be formed therebetween. Alternatively, the first portion 1141 and the second portion 1142 are of different materials and the interface therebetween is substantially leveled with the major surface 116a of the second polymer layer 116. Afterwards, the singulation process may be performed to form individual prism structures 110B that include the first coterminous sidewall 110S1 and the second coterminous sidewall 110S2 opposite to each other. The size of the prism structure 110B may be adjustable depending on product requirements. The prism structure 110B may be picked and placed to be integrated into a package as will be discussed later in other embodiments.

The prism structure 110B includes the carrier substrate 112 serving as a support, the first polymer layer 114 including the first portion 1141 and the second portion 1142 stacked on the first portion 1141, the second polymer layer 116 interposed between the first portion 1141 and the second portion 1142 of the first polymer layer 114, and the reflector layer 115 interposed between the first polymer layer 114 and the second polymer layer 116. The maximum thickness 116H of the second polymer 116 may be referred to as the height of the polymer waveguide. The minimum length 116L1 and/or the maximum length 116L2 of the second polymer 116 may be referred to as the length of the polymer waveguide. The length of the polymer waveguide may be greater than the height of the polymer waveguide. The reflector layer 115 overlies the first portion 1141 of the first polymer layer 114 in the third region R3 and also conforms to the curved profile of the major surface 1141c in the third region R3. The curvature of the reflective surface 115R of the reflector layer 115 may be defined by the curved profile of the major surface 1141c of the first polymer layer 114 in the third region R3. For example, the shapes and the properties of the reflector layer 115, the second polymer layer 116, and the first polymer layer 114 are adjustable by changing process recipe of the gray-scale lithography process.

FIG. 3 is a schematic and perspective view of a reflective surface of a prism structure according to some embodiments. Referring to FIG. 3 and with reference to FIGS. 1E and 2G, the prism structure 100A having the reflective surface 46F2 and the prism structure 100B having the reflective surface 115R are respectively shown in FIGS. 1E and 2G. The main function of the prism structure (e.g., 110A or 110B) is to change the direction of optical path. For example, an optical beam entering from the second polymer layer 116 is reflected by the reflective surface (e.g., 46F2 or 115R) that is endowed with a curvature. For example, the reflective surface (e.g., 46F2 or 115R) of the prism structure is a parabolic surface.

In some embodiments, the reflective surface (e.g., 46F2 or 115R) may be made into a shape in which the radii of curvature differ from each other in two planes (e.g., YZ plane and XZ plane) orthogonal to each other. For example, the radius of curvature Ry of the reflective surface in the Y-cross-section is greater than the radius of curvature Rx of the reflective surface in the X-cross-section. In some embodiments, the radius of curvature Ry of the reflective surface in the Y-cross-section is substantially equal to two times of the radius of curvature Rx of the reflective surface in the X-cross-section. It is noted that the reflective surface shown in FIG. 3 is an example, and any desired shape may alternatively be formed. It is also noted that the specific methods for fabricating the reflective surface of the prism structure are described in the preceding paragraphs, and controlling the radii of curvature of reflective surface of the prism structure may be achieved using gray-scale masking and lithography as mentioned in FIGS. 1A-1E and FIGS. 2A-2G.

Figure 4A:
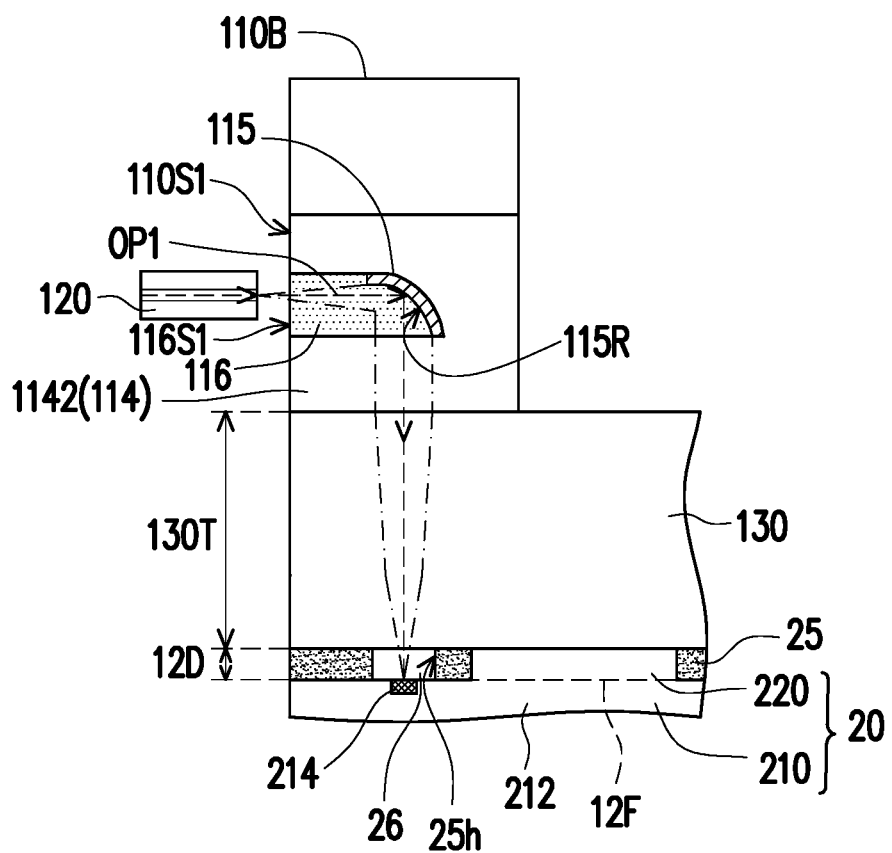
FIGS. 4A-4C are schematic cross-sectional views of various packages with an optical module coupling to a die stack, in accordance with some embodiments.
Figure 4B:
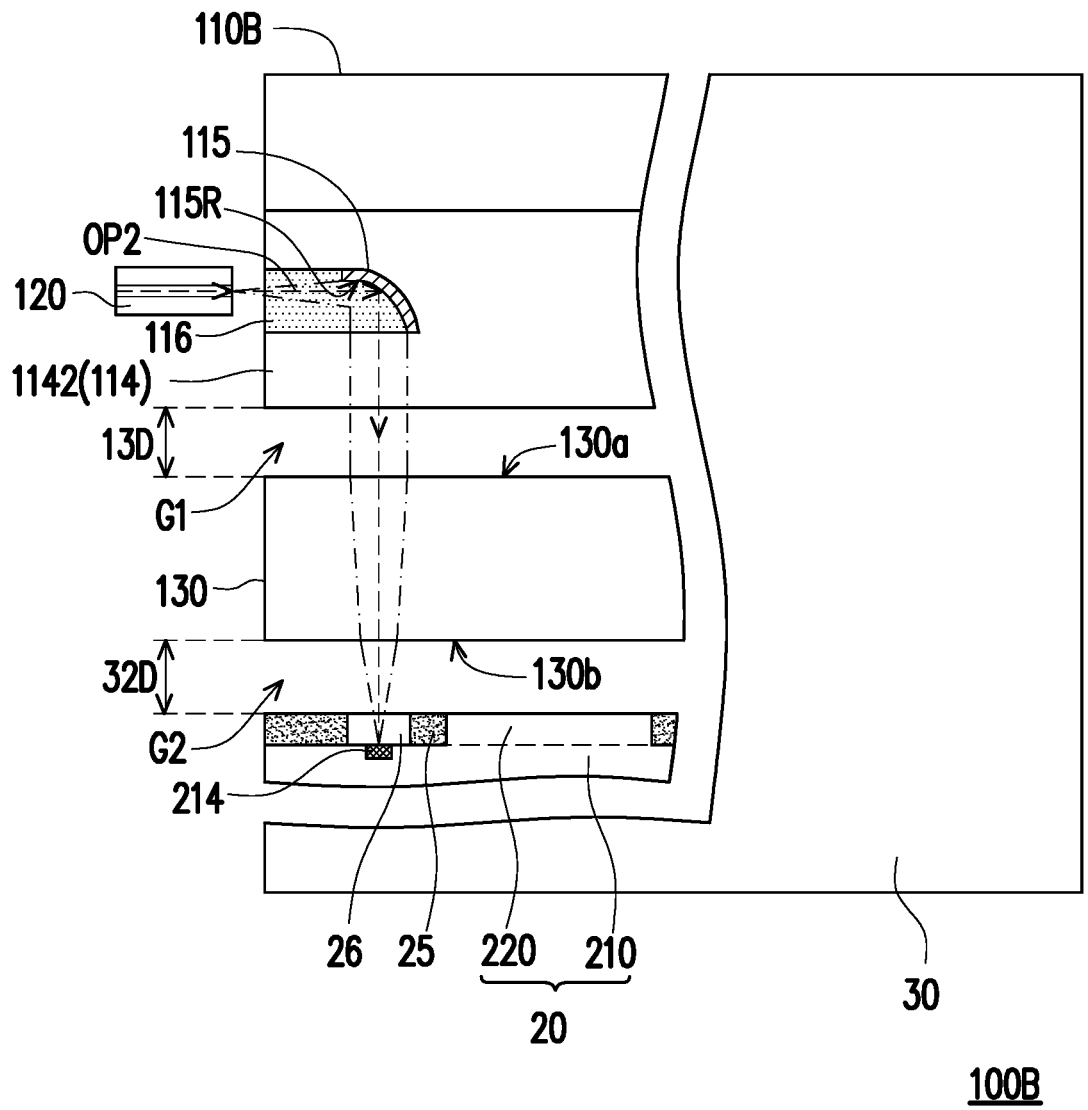
Figure 4C:
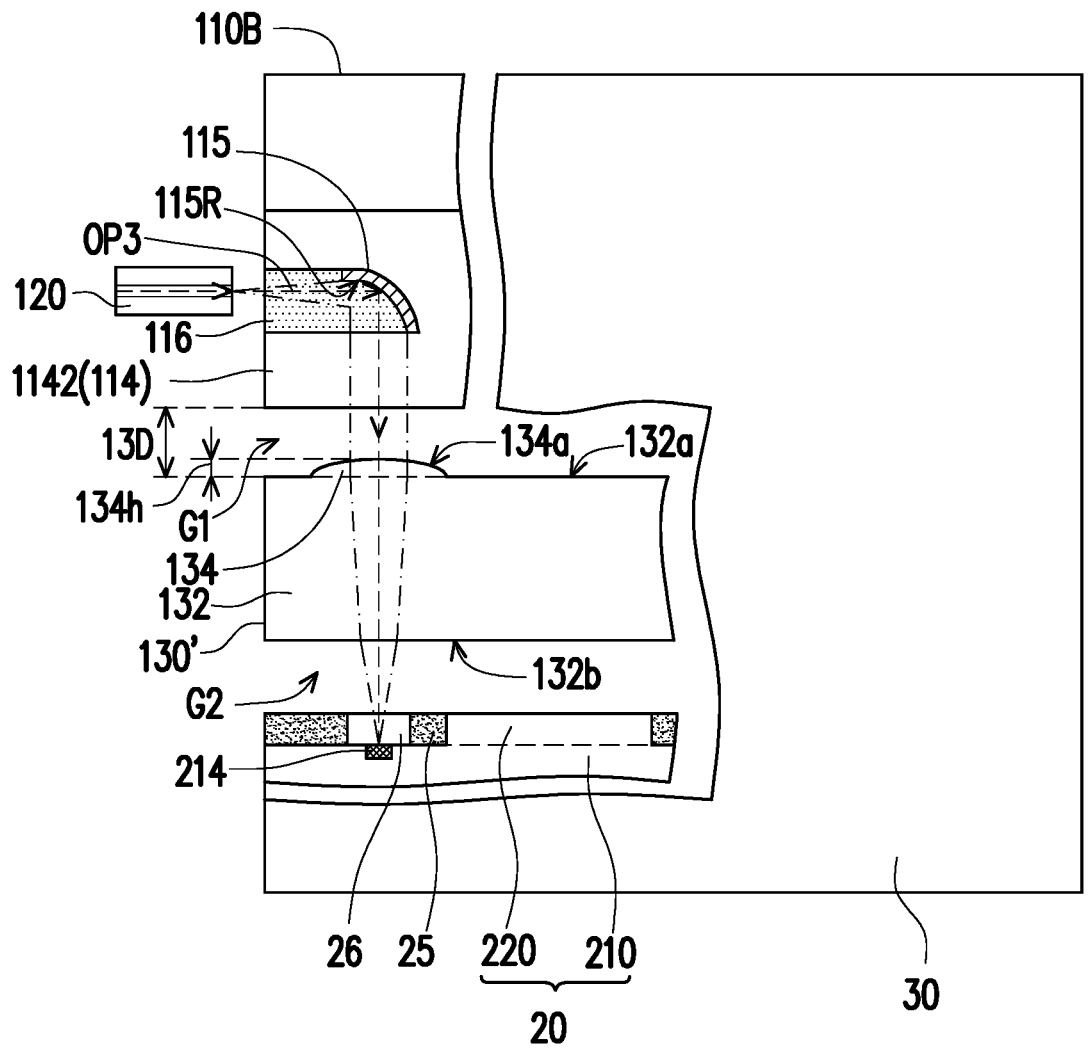

FIGS. 4A-4C are schematic cross-sectional views of various packages with an optical module coupling to a die stack, in accordance with some embodiments. Throughout the various views and illustrative embodiments, like reference numbers are used to designate like elements.

Referring to FIG. 4A, a package 100A including an optical module 10A coupled to a die stack 20 is provided. It is appreciated that the package 100A may include various other package components that may be used for various functions, which are also contemplated in accordance with some embodiments. The package 100A may be a part of an electronic system for such as computers (e.g., high-performance computer), computational devices used in conjunction with an artificial intelligence system, wireless communication devices, computer-related peripherals, and entertainment devices, etc. The package discussed herein may provide broad bandwidth and dense optical signal I/O communication in accordance with some embodiments. It should be noted that other electronic applications are also possible.

In some embodiments, the optical module 10A includes the prism structure 110B, an optical signal source 120 aligned with the prism structure 110B, and a lens 130 interposed between the die stack 20 and the prism structure 110B. In some embodiments, the optical signal source 120 is an optical input/output (I/O) port (e.g., a single-mode, a multi-mode optical fiber, or the like) where optical signals may enter and/or exit. The optical signal source 120 may be disposed in proximity to the first coterminous sidewall 110S1 of the prism structure 110B and aligned with the second polymer layer 116. For example, after aligning the optical signal source 120 with the reflector layer 115, an optical adhesive (not shown) is formed between the optical signal source 120 and the prism structure 110B to provide optical transparency and mechanical fixation. In some embodiments, the optical axis of the optical signal source 120 may be substantially parallel to a normal direction of the first coterminous sidewall 110S1 of the prism structure 110B. In some embodiments, an angle (e.g., between a few degrees to about 90 degrees) is formed between the optical axis of the optical signal source 120 and the first coterminous sidewall 110S1 of the prism structure 110B. The angle between the optical axis and the first coterminous sidewall 110S1 may be adjusted depending on the characteristics of the optical signal source 120 and depending on how well the optical connection is optimized. It is noted that the angle between the optical signal source 120 and the prism structure 110B construe no limitation in the disclosure.

In some embodiments, the second portion 1142 of the first polymer layer 114 overlies the lens 130, and the reflective surface 115R of the reflector layer 114 having the concave profile may face downwardly toward the lens 130. For example, the second portion 1142 of the first polymer layer 114 is in physical contact with the lens 130, and no gap is formed between the first polymer layer 114 of the prism structure 110B and the lens 130. Alternatively, the lens 130 is separated from the overlying prism structure 110B by a non-zero distance as will be discussed later in other embodiments. The lens 130 may be utilized to guide the light to the die stack 20 and may act as a focusing member. The lens 130 includes any suitable material (e.g., silicon, glass, polymer, etc.), and may have a variety of shapes and sizes depending on a refractive index of the material used for the lens and/or a distance between the lens 130 and the die stack 20. In some embodiments, a silicon lens having the higher refractive index (about 3.5) is used, as compared with the refractive index of the lens materials such as glass or polymer. The lens 130 may have a predetermined focal length that is capable of focusing light onto the die stack 20. In some embodiments, the lens 130 is a bulk silicon substrate having the thickness 130T (e.g., about 750 µm). The thickness 130T of the lens 130 may be thinner than 750 µm, depending on the predetermined focal length. In some embodiments, the lens 130 is replaced with or include additional optical interface component (e.g., grating, waveguides, or other suitable component configured to direct light from the prism structure 110B to the die stack 20).

With continued reference to FIG. 4A, the die stack 20 at least includes a photonic die 210 and an electronic die 220 stacked upon and bonded to the photonic die 210. In some embodiments, the die stack 20 is fabricated in a wafer form, in a package form, or the like. The size of the photonic die 210 may be greater than the size of the electronic die 220. For example, the footprint area occupied by the photonic die 210 is greater than the footprint area occupied by the electronic die 220. The footprint area occupied by the electronic die 220 may fully overlap the footprint area occupied by the photonic die 210. Alternatively, the electronic die 220 is staggered with and partially overlaps the photonic die 210. Although one photonic die 210 and one electronic die 220 are illustrated, a plurality of photonic dies arranged as an array and a plurality of electronic dies stacked upon the array of the photonic dies may be possible in accordance with some embodiments. The photonic die 210 may be responsible for the Input-Output (I/O) of the optical signals. For example, the photonic die 210 has the function of receiving optical signals, transmitting the optical signals inside the photonic die 210, transmitting the optical signals out of the photonic die 210, and electronically communicating with the electronic die 220.

In some embodiments, the photonic die 210 includes a substrate 212 that may be a semiconductor substrate (e.g., a silicon substrate, a silicon germanium substrate, etc.), a dielectric substrate, or a substrate formed of other semiconductor materials. The photonic die 210 may include photonic integrated circuits formed in/on the substrate 212 to process, receive, and/or transmit optical signals. The light-to-electrical conversion devices (e.g., photo-diodes) and/or electrical-to-light conversion devices (e.g., light emitting didoes, lamps, or the like) may be built inside the photonic die 210 or external to and attached to the photonic die 210. The photonic die 210 may include at least one coupling region (e.g., an optical component 214) over the substrate 212. The optical component 214 may be or may include grating couplers, I/O couplers, edge couplers, lasers, optical modulators, detectors, waveguides, splitters, converters, switches, etc. In some embodiments, the optical component 214 includes a grating coupler that couples optical signals from the optical signal source 120 to a photodetector (not individually illustrated) within the photonic die 210. The grating coupler may include one or more reflective and/or conductive materials or any other suitable material. Any numbers of gratings in the grating coupler may be used. In some embodiments, integrated electronic devices (e.g., transistors, diodes, capacitors, resistors, metal routing, and the like) may also be formed within the photonic die 210, and may be coupled to the optical component 214 within the photonic die 210.

In some embodiments, the electronic die 220 includes electronic integrated circuits for processing the electrical signals converted from the optical signals in the photonic die 210. In some embodiments, the electronic die 220 exchanges electrical signals with the photonic die 210. The electronic die 220 may be or may include a logic IC die, a memory die, an analog IC die, an application-specific IC (ASIC) die, and/or the like. In some embodiments, the electronic die 220 is a package structure of which a plurality of die components is encapsulated in a packaging encapsulation (not shown).

In some embodiments, the photonic die 210 is a photonic integrated circuit (PIC) die and the electronic die 220 is an electronic integrated circuit (EIC) die. The bonding interface 12F is between the photonic die 210 and the electronic die 220. For example, the electronic die 220 is in electrical communication with the photonic die 210 through connections including a redistribution structure, a plurality of through substrate vias or through interlayer vias, and/or the like. In some embodiments, the bonding of the electronic die 220 and the photonic die 210 may be achieved through solder bonding, direct metal-to-metal bonding, hybrid bonding, etc. By using suitable bonding manner, optimal integration including high-speed and low power operation may be achieved. It is appreciated that photonic die 210 and the electronic die 220 may include various other devices and circuits that may be used for processing and transmitting optical and electrical signals, which are also contemplated in accordance with some embodiments.

Still referring to FIG. 4A, an insulating encapsulation 25 is optionally formed on the photonic die 210 to at least laterally cover the electronic die 220. The insulating encapsulation 25 may be or may include a dielectric material, a polymer material, a underfill material, a combination thereof, and/or other suitable protective material(s). In some embodiments, the insulating encapsulation 25 includes a hole 25h that accessibly exposes the optical component 214, where the hole 25h may be used as a light path to introduce light to the optical component 214. In some embodiments, an optical interface layer 26 is optionally formed in the hole 25h and over the optical component 214. For example, the optical interface layer 26 is index-matched to the optical module 10A to reduce optical loss. The refractive index of the optical interface layer 26 may be selected according to the refractive indices of the optical module 10A. Alternatively, the insulating encapsulation 25 and/or the optical interface layer 26 may be omitted.

In some embodiments, the optical signal source 120 is optically coupled to the die stack 20 through the prism structure 110B and the lens 130. In some embodiments, the lens 130 of the optical module 10A is in direct contact with the electronic die 220, the insulating encapsulation 25, and the optical interface layer 26. That is, no gap is formed between the lens 130 and the underlying structure. The working distance of the lens 130 may be substantially equal to the shortest vertical distance 12D between the lens 130 and the optical component 214 of the photonic die 210. Alternatively, the lens 130 is separated from the underlying structure by a non-zero distance as will be discussed later in other embodiments. In some embodiments, an optical beam OP1 emitted from the optical signal source 120 enters from the incidence surface (e.g., the outer sidewall 116S1) of the second polymer layer 116, is reflected by the reflective surface 115R and travels toward the second portion 114₂ of the first polymer layer 114, and enters the lens 130. The lens 130 acting as the focusing member may focus the input beam onto the optical component 214 of the photonic die 210.

It is understood that the prism structure 110B illustrated herein is an example and may be replaced with the prism structure 110A described in FIG. 1E. In such embodiments where the prism structure 110A is employed, an optical path may be the light emitted from the optical signal source 120, through the second polymer layer 116 and reflected by the second portion 46F₂ of the interface 46F having a concave profile (labeled in FIG. 1D), through the second portion 114₂ of the first polymer layer 114, focused towards the photonic die 210 through the lens 130, then to the optical component 214 of the photonic die 210. Moreover, by forming the prism structure as a package component, integrating the prism structure into the package may be employed to create more compact package.

It is understood that the effective area for a single mode fiber is the cross-sectional area through which light propagates in the fiber and is referred to as the mode field diameter (MFD). In addition, the dimension of the optical beam must match the MFD of the fiber to achieve good coupling efficiency. For example, the mode field dimensions of the incident beam entering the prism structure (e.g., 110A or 110B) and the reflected beam exiting the prism structure substantially match the MFD of the optical signal source 120. This can be achieved by configuring the reflective surface (e.g., 46F₂ or 115R) of the prism structure having selected curvature and shape for matching the MFD of the optical signal source 120. As mentioned above, the curvature (s) of the reflective surface of the prism structure may be controlled by using gray-scale lithography. In some embodiments where the optical signal source 120 is the single mode fiber with the MDF around 9-10 μm, the mode field dimensions of the incident beam entering the prism structure 110B and the reflected beam exiting the prism structure 110B are close to 9-10 μm with the coupling efficiency around 97% to over 99%. Various examples of the prism structure having the reflective surface with proper curvatures may be used for any situation in which a change of mode field dimensions is required, or in which the distance between the prism structure and the die stack has to be adjusted.

Referring to FIG. 4B and with reference to FIG. 4A, a package 100B is similar to the package 100A, and thus some detailed descriptions are not repeated herein. The difference between the packages (100A and 100B) includes that the lens 130 is spatially separated from the overlying prism structure 100B by a non-zero distance 13D. For example, a first gap G1 is between the second portion 1142 of the first polymer layer 114 and a first surface 130a of the lens 130, where the first gap G1 may be air gap or may be filled with an optical interface layer (not shown) for improving coupling efficiency. In some embodiments, the lens 130 is spatially separated from the underlying die stack 20 by a non-zero distance 32D. For example, a second gap G2 is between a second surface 130b of the lens 130 and the underlying structure including the electronic die 220, the insulating encapsulation 25, and the optical interface layer 26, where the second gap G2 may be air gap or additional optical interface layer (not shown) may be formed in the second gap G2 depending on demands of optical system.

In some embodiments, the optical signal source 120 is optically coupled to the die stack 20 through the prism structure 110B and the lens 130. For example, an optical beam OP2 emitted from the optical signal source 120 enters from the incidence surface of the second polymer layer 116, is reflected by the reflective surface 115R and travels toward the second portion 1142 of the first polymer layer 114, exits the prism structure 110B and travels through the first gap G1, and enters the lens 130. The lens 130 may focus the incident beam as it exits the lens 130 and before it couples to the photonic die 210. The optical beam OP2 exiting the lens 130 may travel through the second gap G2 and may be received by the optical component 214 of the photonic die 210. It is appreciated that the prism structure 110B may be replaced with the prism structure 110A as shown in FIG. 1E, in accordance with some embodiments.

With continued reference to FIG. 4B, the package 100B includes a package component 30 that may serve as a support for providing mechanical fixation with the optical module 10A and/or the die stack 20. For example, at least a portion of the prism structure 110B and at least a portion of the lens 130 are attached to the package component 30 to form the first gap G1 and the second gap G2. In some embodiments, IC packaging techniques, such as integrated fanout packaging techniques, are used to fabricate the package component 30. Other packaging techniques may be used to form the package component 30. In some embodiments, the package component 30 may include a package substrate, a printed circuit board (PCB), a printed wiring board, an interposer, and/or other circuit carrier that is capable of carrying integrated circuits. For example, the electronic die 210 may be disposed on the top surface of the photonic die 220 and a plurality of conductive terminals (not shown) may be disposed on the bottom surface of the photonic die 220 for electrically coupling the package component 30. The package component 30 may include a switch, a hub, a bridge, a router, a communication system, a data center, a network, and/or a computer system (e.g., a multiple-core processor computer system). It is noted that the above examples are provided for illustrative purposes only, and other embodiments may utilize fewer or additional elements.

Referring to FIG. 4C and with reference to FIG. 4B, a package 100C is similar to the package 100B, only the differences therebetween will be discussed, and the like or the same part will not be repeated again. The difference between the packages (100C and 100B) lies in that the lens 130' of the package 100C of the optical module 10B includes a main body 132 and a micro-lens 134 disposed on the main body 132. For example, the micro-lens 134 is formed on the first surface 132a of the main body 132, and the second surface 132b of the main body 132 opposite to the first surface 132a faces the die stack 20.

In some embodiments, the main body 132 and the micro-lens 134 are of different materials. For example, a refractive index of the micro-lens 134 is less than that of the main body. In some embodiments, the micro-lens 134 is formed by patterning a polymer material layer formed on the main body 132 that is a silicon substrate. In some embodiments, a thermal process is subsequently performed on the patterned polymer to form a desired shape of the micro-lens. Although any suitable technique may be performed to form the micro-lens 134. The characteristics of the micro-lens 134 may be adjusted by selecting the property of the polymer and controlling the process parameters of the required process to obtain a desired refractive index and a desired surface shape, thereby achieving focusing action. For example, the micro-lens 134 has a convex outer surface 134a with a radius of curvature of about 400 μm and a maximum height 134h of about 2.1 μm. It is noted that these values are merely examples, and other values and other surface shape(s) may be applicable in accordance with various embodiments.

In some embodiments, the micro-lens 134 is aligned over the corresponding optical component 214 of the photonic die 210. Although only one micro-lens is illustrated, a plurality of micro-lens may be arranged as an array on the main body depending on demands of optical system. In some embodiments, an optical path OP3 emitted from the optical signal source 120 enters from the incidence surface of the second polymer layer 116, is reflected by the reflective surface 115R of the reflector layer 115 and travels toward the second portion 1142 of the first polymer layer 114, exits the prism structure 110B and travels through the first gap G1, and enters the lens 130'. The non-zero distance 13D may be large enough to accommodate the micro-lens 134 in the first gap G1. For example, the second portion 1142 of the first polymer layer 114 is spatially spaced from the micro-lens 134. The lens 130' may adjust the optical path and focus the incident beam as it exits the lens 130' and before it couples to the photonic die 210. The optical beam OP3 exiting the lens 130' may travel through the second gap G2 and may be received by the optical component 214 of the photonic die 210. Alternatively, the second gap is omitted and the second surface 132b of the lens 130' is directly attached to the underlying structure including the die stack 20. It is appreciated that the prism structure 110B may be replaced with the prism structure 110A as shown in FIG. 1E, in accordance with some embodiments. The above examples are provided for illustrative purposes only, and other embodiments may utilize fewer or additional elements.

According to some embodiments, a package includes an electronic die, a photonic die underlying and electronically communicating with the electronic die, a lens disposed on the electronic die, and a prism structure disposed on the lens and optically coupled to the photonic die. The prism structure includes first and second polymer layers, the first polymer layer includes a first curved surface concaving toward the photonic die, the second polymer layer embedded in the first polymer layer includes a second curved surface substantially conforming to the first curved surface, and an outer sidewall of the second polymer layer substantially aligned with an outer sidewall of the first polymer layer.

According to some alternative embodiments, a package includes a die stack, a prism structure, a focusing member interposed between the prism structure and the die stack, and an optical fiber. The die stack includes a photonic die and an electronic die over and bonded to the photonic die. The prism structure is optically coupled to the photonic die and includes a first polymer layer, a second polymer layer buried in the first polymer layer, and a reflective surface interfacing the first polymer layer and the second polymer layer and concaving toward the photonic die. The optical fiber faces the second polymer layer and aligned with the reflective surface of the prism structure.

According to some alternative embodiments, a manufacturing method of a package includes at least the following steps. Forming a prism structure includes forming a first portion of a first polymer layer over a carrier substrate, where the first portion comprises a first region, a second region, and a third region connected to the first region and the second region, and a thickness in the third region gradually increases from the first region to the second region; forming a second polymer layer on the first portion of the first polymer layer in the first region and the third region, where a major surface of the second polymer layer is substantially leveled with a major surface of the first portion of the first polymer layer in the second region; forming a second portion of the first polymer layer on the second polymer layer and the first portion of the first polymer layer in the second region. The prism structure and a die stack are integrated, where the die stack includes a photonic die and an electronic die over and bonded to the photonic die, and the prism structure is optically coupled the photonic die.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A package, comprising:
    an electronic die;
    a photonic die underlying and electronically communicating with the electronic die;
    a lens disposed on the electronic die; and
    a prism structure stacked over the lens and optically coupled to the photonic die, the prism structure comprising:
        a first polymer layer comprising a first curved surface concaving toward the photonic die; and
        a second polymer layer embedded in the first polymer layer, the second polymer layer comprising a second curved surface substantially conforming to the first curved surface, and an outer sidewall of the second polymer layer substantially coplanar with an outer sidewall of the first polymer layer in a stacking direction of the prism structure and the lens.

2. The package of claim 1, wherein the prism structure further comprises:
    a reflector layer interposed between the first curved surface of the first polymer layer and the second curved surface of the second polymer layer, and the reflector layer comprising a curved profile substantially conforming to the first curved surface and the second curved surface.

3. The package of claim 2, wherein an end surface of the curved profile of the reflector layer is substantially leveled with a major surface of the second polymer which is connected to the outer sidewall of the second polymer layer.

4. The package of claim 3, wherein the first polymer layer covers the end surface of the reflector layer and the major surface of the second polymer layer.

5. The package of claim 2, wherein the reflector layer comprises a first radius of curvature in a first cross-section and a second radius of curvature in a second cross-section that is different from the first radius of curvature in the first cross-section.

6. The package of claim 1, wherein the second curved surface of the second polymer layer comprises a first radius of curvature in a first cross-section and a second radius of curvature in a second cross-section that is different from the first radius of curvature in the first cross-section.

7. The package of claim 1, wherein the lens is spatially separated from the prism structure by a non-zero distance.

8. The package of claim 7, wherein the lens comprises a main body and a micro-lens disposed on the main body and in proximity to the prism structure.

9. The package of claim 8, wherein a refractive index of the main body is substantially greater than that of the micro-lens.

10. The package of claim 1, further comprising:
    an optical signal source facing the outer sidewall of the second polymer of the prism structure, and the optical signal source optically coupled to the photonic die through the prism structure and the lens.

11. The package of claim 1, wherein:
    the second polymer layer of the prism structure comprises an outer sidewall and a major surface connected to the outer sidewall, and
    the outer sidewall of the second polymer layer is substantially aligned with an outer sidewall of the first polymer layer, and the major surface of the second polymer layer is covered by the first polymer layer.

12. The package of claim 1, wherein the prism structure further comprises a reflective surface interfacing the first polymer layer and the second polymer layer, the reflective surface of the prism structure comprises at least two distinct radii of curvature in different cross-sections.

13. The package of claim 1, wherein the prism structure further comprises a carrier substrate overlying the first polymer layer, and an outer sidewall of the carrier substrate is substantially aligned with the outer sidewall of the first polymer layer.

* * * * *